Jan. 16, 1923.

1,442,173.

E. E. NOVOTNY.
MOLDED PRINTING PLATE.
FILED JAN. 21, 1921.

Inventor
Emil E. Novotny,
By his Attorneys

Patented Jan. 16, 1923.

1,442,173

UNITED STATES PATENT OFFICE.

EMIL E. NOVOTNY, OF PHILADELPHIA, PENNSYLVANIA, ASSIGNOR TO JOHN STOGDELL STOKES, OF PHILADELPHIA, PENNSYLVANIA.

MOLDED PRINTING PLATE.

Application filed January 21, 1921. Serial No. 438,925.

*To all whom it may concern:*

Be it known that I, EMIL E. NOVOTNY, a citizen of the United States, and resident of Logan, Philadelphia, in the county of Philadelphia and State of Pennsylvania, have invented certain new and useful Improvements in Molded Printing Plates, of which the following is a specification.

This invention relates to molded printing plates.

Heretofore in the manufacture of molded printing plates, it has been proposed to use as the material for the plates a plastic such as a synthetic resin, in the nature of a phenolic condensation product, capable of being reacted, under the influence of heat and pressure, from a plastic fusible condition to a non-plastic infusible state.

In its infusible state such substance forms a hard, set, non-flowing, non-plastic mass, which has heretofore been considered incapable of use for the molding of articles, such, for example as printing plates. Its inapplicability for this purpose has been attributed to the fact that in its infusible state the synthetic resin is substantially inert, dry and non-plastic, even when subjected to further heat and pressure. For instance, I have subjected a mass of powdery or comminuted infusible synthetic resin, such as a phenolic condensation product, to the action of heat alone, at the relatively high temperature of 420° F., which is far above the melting point of fusible phenolic condensation products, and have observed no effect on the mass, as the latter has retained its powdered condition, showing no signs of amalgamation or fusing. I have also subjected a mass of powdered infusible synthetic resin to relatively high pressure, about 2000 pounds to the square inch, in a cold hydraulic press, and upon the relief of the pressure have found the mass to still retain its powdered condition. I have discovered that I can subject a powdered body of infusible, synthetic resin to the action of relatively low heat and pressure for a comparatively short period of time, for example, a pressure of about 500 pounds to the square inch at a temperature of about 330° F., for from one to five minutes, with the result that the powdery mass will weld into a homogeneous body. By the use of the word welding I most aptly describe the transformation of the infusible powdery mass into a homogeneous or amalgamated body, as this action takes place while the infusible powder is in a dry or unmelted condition and without any appreciable flow.

In the manufacture of my printing plate, the employment of an infusible synthetic resin possesses numerous advantages over the use of fusible synthetic resin or of a permanently thermoplastic resin—the latter being formed by adding a plasticity agent or solid solvent to a body of synthetic resin for the purpose of maintaining the mass in a permanently thermoplastic state. Some of the advantages incident to the use of the infusible synthetic resin in the manufacture of my printing plate may be enumerated as follows:—

The plates may be molded against printing plate matrices having the molding faces thereof formed of synthetic resinous material, because the infusible synthetic resin, under the welding action will not stick or adhere to the matrix face, as would be the case with a fusible resin employed in making the plate. This enables me to dispense with the use of comparatively expensive metallic-faced matrices, which while particularly adapted for use in molding fusible synthetic resins, the fusible resin will not adhere or stick to the metal face, yet such matrices do not posses the strength or resistance to pressure incident to a synthetic resin matrix, and are liable to scratching and marring on the metal face. Furthermore, the dry infusible synthetic resin which I use in making the present printing plate has been so preliminarily treated in reducing it to a state of infusibility, as by subjection to heat, that all gases and moisture have been driven off from the resin and therefore in the molding or welding operation there are no imprisoned gases to be liberated with the consequent liability of causing blistering, warping and distortion of the molded article. Consequently a printing plate made from the infusible synthetic resin may be subsequently used in making stereotype and other matrices in a heat process. This could not be done with a printing plate made from fusible resin, owing to the fact that the imprisoned gases are liable to be liberated under a subsequent heat treatment, resulting in the distortion of the matrix being made and even of the printing plate itself which is being used as the master. Another advantage incident to the use of this infusible material is that discarded articles formed of infusible synthetic resins such as printing plates, old sound records, and the like, may be reclaimed and ground up or comminuted to provide material for making printing plates by my process. Heretofore such discarded articles have been considered as useless, so far as the reuse of the material is concerned, and have been practically a dead loss.

With the above recited objects and others of a similar nature in view, my invention consists in the improved printing plate set forth in and falling within the scope of the appended claims.

In the accompanying drawings—

Figure 1:
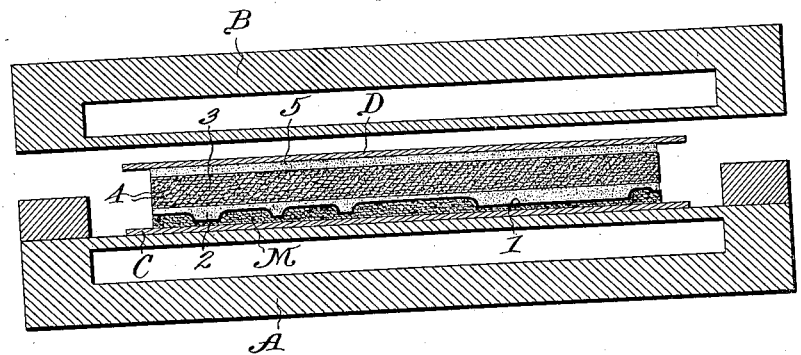
Figure 1 is a view illustrating conventional platens of a heated press, and showing, in cross-section, one of my improved printing plates in the process of manufacture.

Referring now to the accompanying drawings in detail, the letter A indicates conventionally the bottom platen of a heated hydraulic press, while B is the top platen thereof. In manufacturing my printing plate, I practically proceed as follows:

I provide a matrix such as shown at M which may be of any suitable character provided with a molding face designed to reproduce printing characters. This matrix is preferably composed of a body containing an infusible synthetic resin, and may be made in the same manner as hereinafter described for making the printing plate, the matrix, however, being molded against an original body of type, plate, etching or the like. This matrix is imposed upon a metal sheet C, and the face of the matrix is preferably brushed or coated with an exceedingly thin film of graphite shown at 1, to lubricate or polish the face of the matrix, thus insuring ready separation of the printing plate from the matrix. In making the printing plate, I impose upon this polished surface of the matrix, a layer of dry, infusible, synthetic resinous powder shown at 2, which has been ground or comminuted to the desired fineness. In preparing this powder I may take a body of fusible synthetic resin and reduce the same in a ball mill or the like to a powdered condition. This fusible powder is then put in a suitable receptacle and placed in an oven where it is subjected to heat of a temperature of from 200° to 250° F. for about from two to six hours, to drive off all ammonia and water gases to cause chemical reaction of the mass, which will result in changing the same from a plastic, fusible to a dry, non-melting or infusible state. When removed from the oven, the new infusible mass may be found to have slightly amalgamated or to have formed lumpy particles, and therefore I preferably again subject the new infusible body to the action of a fine grinding mill to reduce the same to a fine uniform powder. This is the powder which is sprinkled or otherwise applied to the face of the matrix, as indicated at 2. I then impose upon this powdery layer 2, a backing 3, which is preferably formed of a porous, fibrous sheet, such as strawboard, which has impregnated or incorporated therein an infusible synthetic resin as indicated at 4, with the resin being reduced to a state of infusibility within the sheet prior to the application of the backing board to the powdery layer on the matrix. This incorporation of the infusible synthetic resin in the fibre backing sheet may be done either by saturating the sheet in a liquid-like fusible body of synthetic resin and then subjecting the saturated sheet to heat for a sufficient length of time to drive off the gases and moisture, and to harden and set the synthetic resin to infusibility, or an infusible synthetic resinous powder may be mixed with a mass of fibre pulp in a beating mill, with the resultant pulp composition subsequently rolled or formed into dry sheets in any well known manner.

I now preferably impose upon the backing sheet, a second layer of infusible synthetic resinous powder 5, which is similar to the powder of the layer 2, and upon the powdery layer 4, I place a metallic sheet D, similar to the metal sheet C.

The press is now closed, and the built-up plates subjected to heat and pressure against the matrix, at a suitable temperature, say 330° F. for the desired period of time, say from one to five minutes, so that the infusible powdery layers will undergo compression and heating action, which will result in the reproduction in the powder layer 2 of the molding face of the matrix, and also cause the particles of powder to weld or amalgamate in a homogeneous, solid, sheet-like mass, without flow and without fusing or melting. At the same time the impregnated backing sheet will be united in an integral structure with the now homogeneous surface layers and the printing plate indicated as an entirety by the letter P in Figure 2 will result. The press may now be opened, the assembled parts withdrawn, the metal sheets D and C removed, and the plate stripped from the matrix while still hot. This is also a distinct advantage in the manufacture of plates, as it releases the matrix for use in subsequent molding operations, and of course results in the saving in the overhead operation of the press. When using fusible resins against a metal-faced matrix, a certain time must elapse to allow for cooling before the article can be stripped from the matrix. Otherwise, blistering and roughening of the face is liable to result. Owing to the fact that the synthetic resin has maintained its dry, non-melting condition, it will not adhere to the face of the matrix, as in the case of a melted or fused resin, but may be readily stripped while still hot.

Figure 2:
Figure 2 is a cross-sectional view of a finished printing plate made on press shown in Figure 1.
Figure 3:
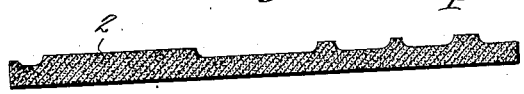
Figure 3 is a cross-sectional view of a modified form of a printing plate.
Figure 4:
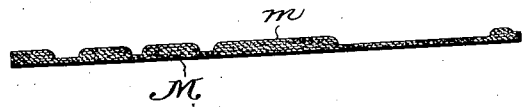
Figure 4 is a cross-sectional view of a matrix such as shown in Figure 1, which may be used in the making of my printing plate.

In Figure 3, I have shown at P' a modified form of printing plate which is made entirely of an infusible synthetic resin, which has been applied to the matrix preferably in powdered form, as described for the layer 2, shown in Figure 1. In other words, I have found that by using the infusible comminuted synthetic resin I may make an all-resinous plate against a resin-faced matrix without adherence or sticking, or with a positive, true amalgamation or welding between the particles of the mass. However, from the standpoint of strength, durability, lightness and other features of advantage, I prefer to form the plate as heretofore described, and as shown in Figure 2.

In some instances, instead of applying the infusible synthetic resinous powder directly to the face of the matrix, I may coat one face of the backing sheet 3 with a varnish-like layer of synthetic resinous material and then sprinkle or coat the printing layer with the infusible synthetic resinous powder, and subject the sheet so coated to heat, to cause a reaction of the varnish to a state of infusibility. Of course the backing layer of powder 5 may be similarly bonded to the impregnated fibre sheet, or in other words, one or both faces of the backing sheet may have the infusible powder bonded thereto by a layer of cement prior to the molding of the printing plate.

In the manufacture of my printing plates, any well known composition of synthetic resin may be employed, such, for instance as phenolic condensation products, composed of phenol and formaldehyde; phenol and acetaldehyde; or phenol and furfural, each composition preferably having mixed therewith a suitable catalyst, such as ammonia or hydrochloric acid, and also a suitable hardening agent such as hexamethylenetetramin or furfuramid. Therefore, I do not limit myself with this invention to the use of any particular synthetic resin, the only requirement being that the resin shall be capable of assuming a state of substantial infusibility. Furthermore, while I may employ a metal-faced matrix in the manufacture of my printing plates, I prefer, for the reasons hereinbefore recited to use a matrix embodying a structure particularly as to its molding face and infusible synthetic resinous material.

I am aware of the fact that it has been proposed to form a molding composition by adding a plasticity agent or solid solvent to an infusible synthetic resinous mass, thereby rendering the mass permanently thermoplastic, in the sense that after having once been hardened and set under heat, pressure and cooling, it may again be resoftened by subjection to heat. But such a permanent thermoplastic composition would not fulfill my requirements, as under the action of heat such a material would stick to a synthetic resinous matrix, and could not be separated therefrom without damage to the parts, and furthermore would render a printing plate made therefrom useless for making stereotype or other matrices, owing to the heat applied in such process.

What I claim is—

1. A printing plate having a printing face composed of a homogeneous layer of infusible, synthetic resin having printing characters thereon, said layer being formed of welded, powdery, infusible synthetic resin.

2. A printing plate comprising a body portion having front and back faces formed from welded layers of powdery, infusible synthetic resin, one of said layers having printing characters formed thereon.

3. A printing plate comprising a porous backing section having an infusible, synthetic resin incorporated therewith and a printing face section formed from a welded layer of infusible, powdery synthetic resin, said face section having printing characters formed thereon to constitute a printing face.

Signed at Philadelphia, in the county of Philadelphia and State of Pennsylvania, this 4th day of January, A. D. 1921.

EMIL E. NOVOTNY.